United States Patent [19]
Hoffman et al.

[11] Patent Number: 5,815,678
[45] Date of Patent: Sep. 29, 1998

[54] METHOD AND APPARATUS FOR IMPLEMENTING AN APPLICATION PROGRAMMING INTERFACE FOR A COMMUNICATIONS BUS

[75] Inventors: Gary Alan Hoffman; Eric Thomas Shalkey; Daniel Joseph Moore, all of Austin; Oscar Reid Mitchell, Pflugerville; Rajat Datta, Round Rock, all of Tex.

[73] Assignee: Adaptec, Inc., Milpitas, Calif.

[21] Appl. No.: 503,078

[22] Filed: Jul. 14, 1995

[51] Int. Cl.$^6$ .................................................. G06F 13/00
[52] U.S. Cl. ............................................ 395/309; 395/828
[58] Field of Search ............................... 395/285, 682, 395/821, 309, 828–834

[56] References Cited

U.S. PATENT DOCUMENTS

| | | | |
|---|---|---|---|
| 3,749,845 | 7/1973 | Fraser | 179/15 AL |
| 5,369,617 | 11/1994 | Munson | 365/219 |
| 5,426,513 | 6/1995 | Scorse et al. | 358/433 |
| 5,535,342 | 7/1996 | Taylor | 395/307 |
| 5,548,777 | 8/1996 | Woo | 395/821 |
| 5,566,346 | 10/1996 | Andert et al. | 395/828 |

*Primary Examiner*—Ayaz R. Sheikh
*Assistant Examiner*—David A. Wiley
*Attorney, Agent, or Firm*—Raymond M. Galasso

[57] ABSTRACT

A system and method for creating a high-level application programming interface allows simplified control and usage of digital data being transported over an IEEE 1394 serial bus under a variety of operational environments. The system and method of controlling communications on a communications bus includes determining a number of adapters attached to the communications bus, establishing a link between an application program and one or more of the adapters; allocating buffers for data transfer; mapping a memory buffer to a space in storage associated with the communications bus; and executing the applications program.

14 Claims, 8 Drawing Sheets

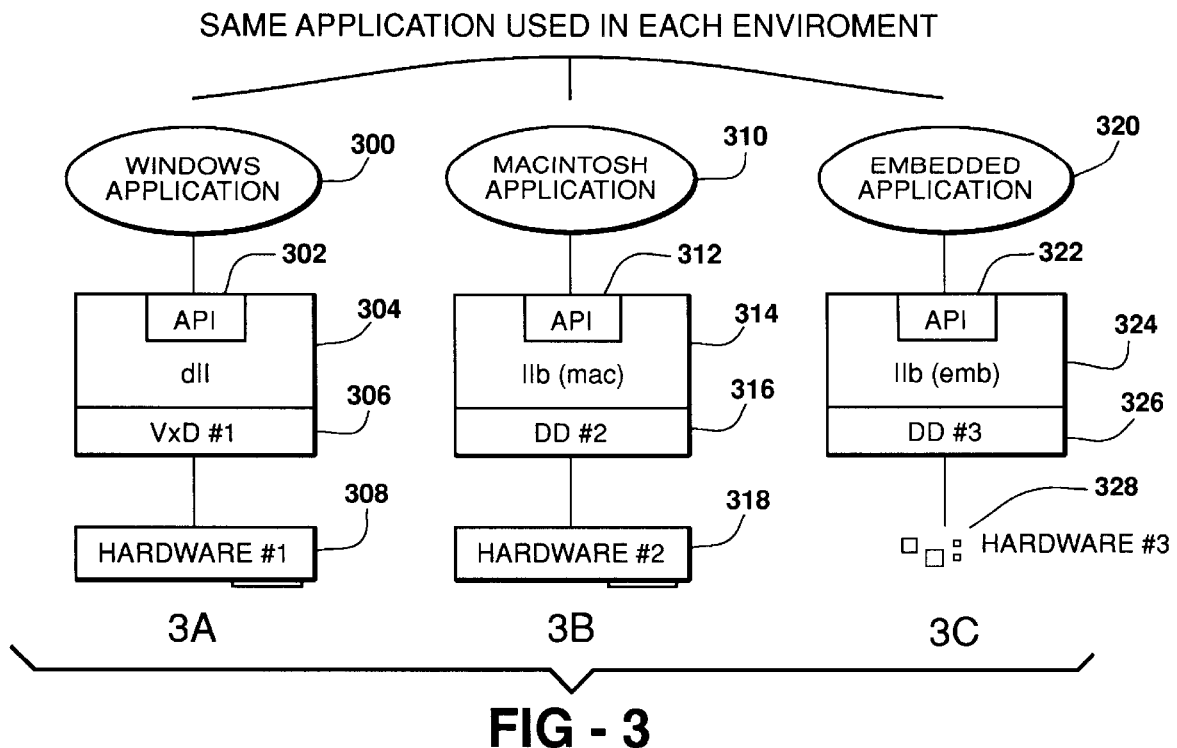
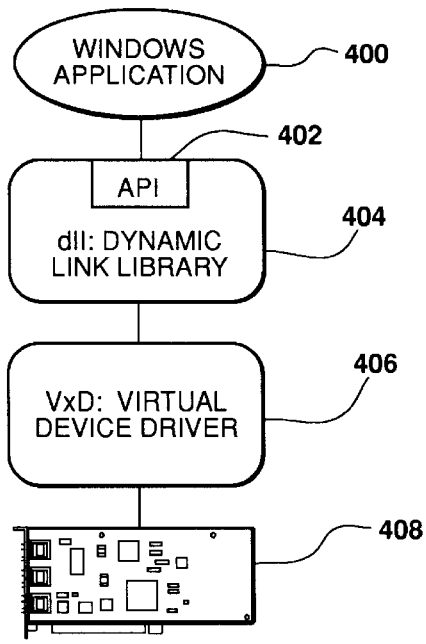

METHOD AND APPARATUS FOR IMPLEMENTING AN APPLICATION PROGRAMMING INTERFACE FOR A COMMUNICATIONS BUS

FIELD OF THE INVENTION

This invention generally relates to the transport of digital data and more particularly to method and apparatus for implementing an application programming interface for a serial bus architecture.

BACKGROUND OF THE INVENTION

The Institute of Electrical and Electronic Engineers (IEEE) has promulgated a standard for transmission of multimedia data over a serial communications channel. This standard has been identified as the IEEE 1394 serial bus architecture. It promises to revolutionize the transport of digital data for computers and for professional and consumer electronics products. By providing an affordable high-speed method of interconnecting digital devices, a more versatile I/O connection has been established. This serial bus architecture is the basis for the integration of all devices involving the transport of digital data including electronic entertainment, communication, and computing, as well as test and measurement, command and control, and computer peripherals. The scalable architecture and flexible peer-to-peer topology makes IEEE 1394 ideal for connecting devices ranging from printers and computer hard drives to digital audio and video hardware with real time processing requirements for on-time multimedia.

PRIOR ART

The IEEE P1394 Draft Standard and the ISO/IEC 13213 CSR Standard may be obtained from the IEEE Computer Society, Washington, D.C., USA, 1-800-678-IEEE. This draft standard is incorporated by reference herein.

SUMMARY OF THE INVENTION

Accordingly, it is a primary objective of the present invention to provide a system and method to implement the IEEE 1394.

This and other objects of the present invention are accomplished by apparatus and method which implement a physical interface, a physical layer, a link layer a transaction Layer, serial bus management and an Application Programming Interface (API). The current embodiment is designed for a PC-compatible computer using the Microsoft Corporation Windows operating system but future embodiments are planned for a variety of hardware and software configurations as well as different functional partitions between hardware and software.

BRIEF DESCRIPTION OF THE DRAWINGS

FIG. 3 illustrates how variations of the SerialSoft software may be used in various processing and hardware environments.

FIG. 4 illustrate the current embodiment of the SerialSoft software and hardware.

DETAILED DESCRIPTION OF PREFERRED EMBODIMENTS OF THE INVENTION

The preferred embodiment of the present invention is designed for use with a PC-compatible computer using the Microsoft Corporation Windows operating system. However, alternate embodiments may be implemented for use with a variety of hardware and software configurations as well as different functional partitions between hardware and software.

Figure 1:
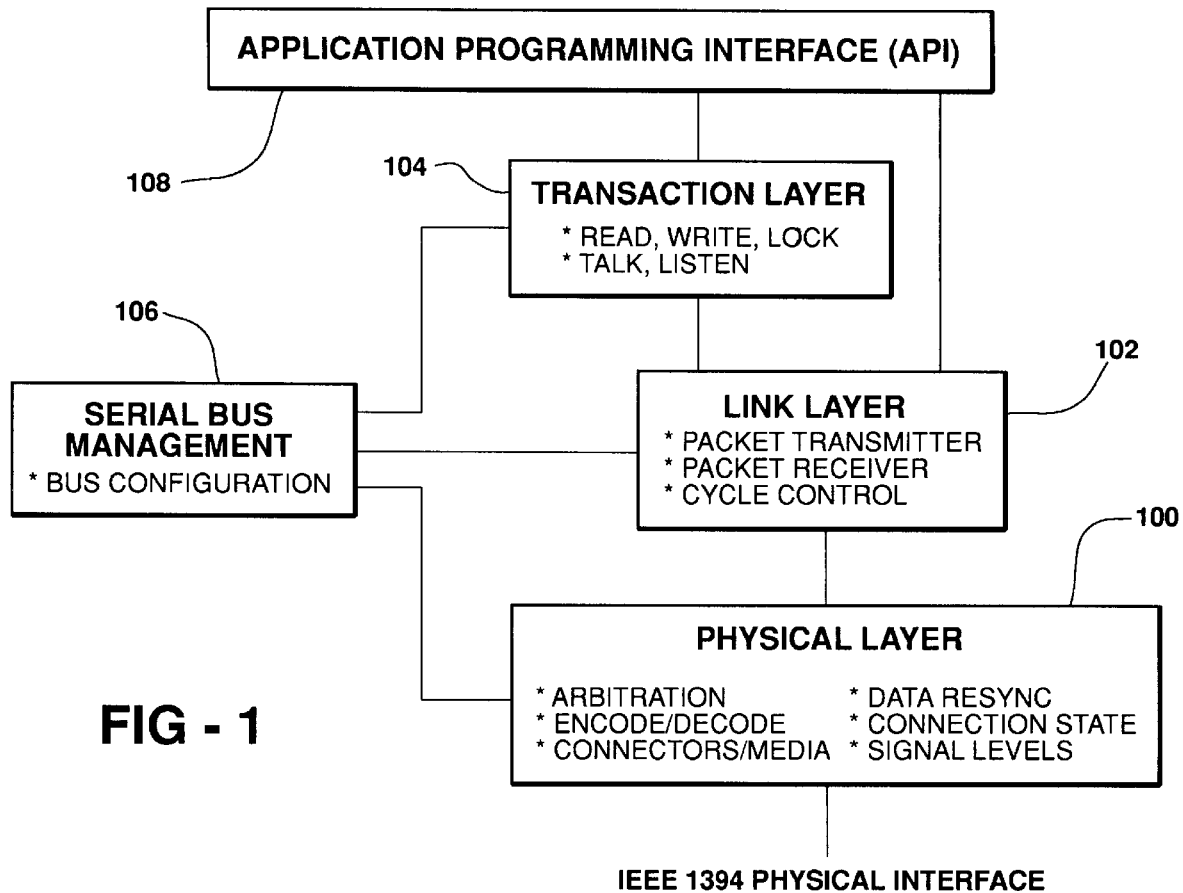
FIG. 1 is a block diagram of the IEEE 1394 protocol layers in accordance with the IEEE 1394 specification and the Application Programming Interface of the subject invention.

FIG. 1 illustrates the three protocol layers of the IEEE 1394 architecture. The Physical Layer 100, the Link Layer 102 and the Transaction Layer 104, Serial Bus Management 106 connecting all three layers, and the Application Programming Interface (API) 108.

The Physical Layer 100 provides the electrical and mechanical connection between an IEEE 1394 device and an IEEE 1394 cable. Besides actual data transmission and reception, the Physical Layer provides arbitration to insure all IEEE 1394 devices have fair access to the bus.

The Link Layer 102 provides data packet delivery service for the two types of packet transport: asynchronous and isochronous. Asynchronous transport uses a conventional transmit-acknowledgment protocol while isochronous transport provides the real-time guaranteed-bandwidth protocol for just-in-time data delivery.

Asynchronous communications are used within the IEEE 1394 environment as a simple memory to memory data transfer paradigm for nodes that do not have time-critical requirements, a command and control mechanism for nodes that do have time-critical requirements, and as a fundamental way to access well known memory locations defined by the IEEE 1394 standard for each transaction capable node. A typical asynchronous application is the transport of control data to setup the state of a video camera—the control data is not time-critical as it need not arrive at the video camera at a specific point in time.

Isochronous communications are supported for use with applications that have a time-critical data requirement. IEEE 1394 supports up to 64 concurrent isochronous channels. To use it, applications must first reserve a channel number and a block of bandwidth with the isochronous resource manager. Applications may then allocate user buffer space and request the API to send some amount of data within it during each IEEE 1394 isochronous bus cycle, which occurs every 125 micro-seconds. A typical time-critical isochronous application is the transport of video data from the video camera that was previously set up by the asynchronous application—the video camera data is time-critical as it must be transported with complete time-synchronization to be usable.

The Transaction Layer 104 supports (1) the ISO/IEC 13213 Control and Status Register Architecture, (2) the asynchronous data transport commands: write, read and lock, and (3) the isochronous data transport commands: talk and listen.

The command, write, sends asynchronous data from the originator to the target IEEE 1394 node while read accepts asynchronous data from this node. Lock performs an asynchronous atomic operation to the target IEEE 1394 node. Lock prevents multiple originators from concurrently accessing the same memory in the target IEEE 1394 node which may produce unpredictable results. Applications may map their own user memory spaces to act as targets for such operations. The lower layer implementation takes care of mapping user address spaces to 1394 address spaces so operations from other nodes are routed to the correct application address space.

The command, talk, sends isochronous data from the originator to a specific IEEE 1394 channel while listen accepts isochronous data from a specific channel. Any node on the bus can register to listen to this data stream by allocating a user data buffer and making a request of the API. Each channel will have only one talker, but possibly multiple listeners. Talkers who wish to stop transmitting data may inform the isochronous resource manager to release the channel resources to other nodes that may require it.

Serial Bus Management 106 contains both isochronous resource management and full bus management to provide overall configuration control of the serial bus in the form of optimized arbitration timing, guarantee of adequate electrical power for all devices on the bus, assignment of the cycle master, assignment of isochronous channel and bandwidth resources, and basic notification of errors.

The isochronous resource manager provides the means necessary for IEEE 1394 nodes to cooperatively allocate and deallocate isochronous channel and bandwidth resources. The isochronous resource manager also provides a common location where IEEE 1394 nodes may find the identity of the bus manager, if available. If a bus manager is not available, the isochronous resource manager may assume some of its function, namely limited power management and cycle master start.

The bus manager is responsible for maintaining the overall operation of the IEEE 1394 bus. The bus manager functions include activation of the cycle master, bus performance optimization and bus topology management. Each IEEE 1394 bus segment can have one and only one bus manager.

The application programming interface (API) 108 is a collection of programming calls used by an application to manage data being written to and obtained from a device connected to an IEEE 1394 bus.

In the preferred embodiment o f the present invention as shown in FIG. 1, items 100 through 108 represent a collection of bus interface implementations usable by all who produce products for IEEE 1394. These implementations consists of IEEE 1394 processing software common to all implementations and of software specific to a given IEEE 1394 interface hardware implementation. To execute on a different operating system, this software is ported to the new operating system without need for a complete redesign.

Regardless of the hardware or software environment, the programming calls of API 108 are identical in all configurations.

The following list of data types is presented to provide further understanding of the API.
Adapter Number
 The API is designed to support multiple IEEE 1394 interface adapters in one IEEE 1394 device. The adapter number is used by the API to specify which adapter the application wishes to use.
1394 Handle
 The IEEE 1394 handle is a logical identifier used by the API to maintain the relationship between the application and the adapter it is using. Its value is set when the adapter is first opened and it is used thereafter to identify that relationship in subsequent calls to the API.
1394 Address
 Any given node on an IEEE 1394 bus usually supports several independent logical functions. At a minimum, the node contains CSR registers (which can be inspected by other nodes) and some sort of application. Some nodes support several different logical applications. The IEEE 1394 Address is a 48-bit field used in the IEEE 1394 read and write transactions to identify the function being communicated with at another IEEE 1394 node.

In general, it is the responsibility of the application to know what address the application on the other node is using to receive read and write transactions. There is no particular relationship between the 48-bit address used by an application and the physical address the application might occupy in the other node's memory.

If the application is going to make a service available to other nodes on the bus, the application must register an IEEE 1394 address with the API using the command, map_1394_space( ).
Buffer Address
 The API allows applications to achieve maximum performance in transferring data across the bus. The API does not add any buffering between the application and the hardware. The application must provide a buffer for the API to read data from and write data to.

Since IEEE 1394 data transport software must be optimized for performance, these applications must provide buffers that are always available. This buffer must therefore be fixed in memory and not be swapped to a paging device. For proper operation, this allocation must be accomplished by the API call, allocate_buffer( ). Once the buffer is allocated, a pointer is used to communicate its address to the API for subsequent operations.
World Wide Unique ID
 The World Wide Unique ID (WWUID) provides a unique and stable identification of each IEEE 1394 device attached to the IEEE 1394 bus. The 64-bit WWUID provides an unique identification for each IEEE 1394 node using the ISO/IEC 13213 (formerly IEEE 1212) CSR registers for Node_Vendor_ID and Node_Unique_ID.

The Node_Vendor_ID is a 24-bit identifier assigned to each manufacturer by the IEEE. This identifier is described in detail in chapter 8 of the ISO/IEC 13213 specification. The Node_Unique_ID is a 40-bit field whose content is controlled by each manufacturer. The only requirement of the standard is that the combination of Node_Vendor_ID and Node_Unique_ID be unique for each piece of hardware manufactured by a vendor.

This combination of Node_Vendor_ID and Node_Unique_ID is considered to be the World Wide Unique ID by the API. The API header file defines a type and a structure for storing this information. All application level addressing is handled by using these identifiers rather than Phy ID numbers. In this manner, the addressing survives a bus reset during which the assignment of Phy ID numbers might be completely rearranged. The router capability of the API handles the problem of translating the World Wide Unique ID into the current bus segment and Phy ID.

Figure 2:
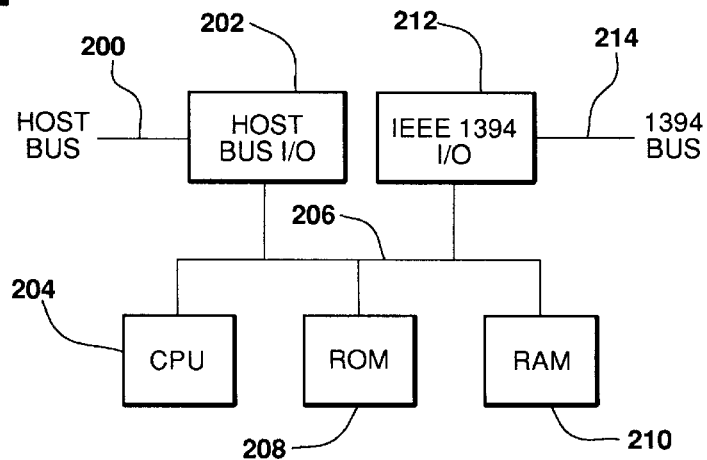
FIG. 2 is a block diagram of the processing engine in accordance with the subject invention.

This invention can be practiced in a variety of representative hardware environments. A processing engine such as depicted in FIG. 2 is typical of the hardware environment where data is processed between a host and the IEEE 1394 bus. The host unit has a host bus 200 used for the host's internal data transfer that is connected to unit 202, the Host Bus I/O. The host bus could be IEEE 1394 or any other bus protocol. The processing engine is controlled by a central processing unit (CPU) 204, such as a conventional microprocessor, and a number of other units interconnected by an internal bus 206. The processing engine shown includes a Read Only Memory (ROM) 208, a Random Access Memory (RAM) 210, and an IEEE 1394 I/O unit 212 which connects to the IEEE 1394 bus 214.

In a computer environment, the host bus is the computer's I/O bus 200 and the CPU 204 could be either the computer's central processing unit or a separate CPU devoted to IEEE 1394 processing. In an embedded environment such as a video set top box, the host bus might be the digital video signal entering the set top box and the CPU could be a separate CPU devoted to IEEE 1394 processing.

FIG. 3 illustrates several variations of software and hardware in accordance with the present invention. In FIG. 3A a Windows application 300 interfaces with API 302 which communicates with the IEEE 1394 dynamic link library (dll) 304, the IEEE 1394 interface-dependent Virtual Device Driver (VxD #1) 306, and the IEEE 1394 hardware interface 308.

In FIG. 3B, the Windows application 300 has been ported to a Macintosh application 310 and interfaces with API 312. The calling structure for this API 312 is identical to the calling structure for its Windows' API counterpart 302 with just the underlining code ported to Macintosh. The Windows dynamic link library 304 is ported to its Macintosh library (lib) equivalent and the interface-dependent device driver (DD #2) is used for a different IEEE 1394 hardware interface 318. To the application, nothing about the API has changed.

In FIG. 3C, the original application has been ported to an embedded processor application 320 such as a set-top box but still written to the same API 322 as in FIGS. 3A and 3B, APIs 302 and 312 respectively. An embedded processor library (lib) 324 and a device driver (DD #3) 326 is used for this hardware 328. Except for the porting process, the same application is used as in the first two cases.

The present invention provides for system protection of IEEE 1394 data to enhance security. This protection prevents unwanted IEEE 1394 devices from affecting the data and status of a protected node. The present invention enables system protection on chips designed to support such capabilities but may also provide software controlled protection where the hardware lacks this feature.

Components

FIG. 4 illustrates the content and relationship of the preferred embodiment of the invention. This embodiment is for use with a PC-compatible computer using the Windows operating system:

The application 400 is the user's program that will communicate using the IEEE 1394 bus. The application communicates with the IEEE 1394 bus only through API 402.

The API 402 is the programming interface to which the application is written. The API is a collection of programming calls that provide high-level support over bus communication thus freeing the application from involvement with the details of programming the low level interface to the IEEE 1394 bus.

The dll (dynamic link library) 404 is Windows code implementing the API and provides an interface to the VxD (see next). The dll (or its counterparts for other operating systems) is common to all implementations.

The VxD (virtual device driver) 406 provides the Windows interface to the IEEE 1394 Interface Adapter Card 408. A different VxD (or its counterparts for other operating systems) is available for each IEEE 1394 interface.

The interface card 408 provides the interface between a computer's internal PCI bus and an external IEEE 1394 bus.

DEVELOPMENT ENVIRONMENT EXAMPLE

Figure 5:
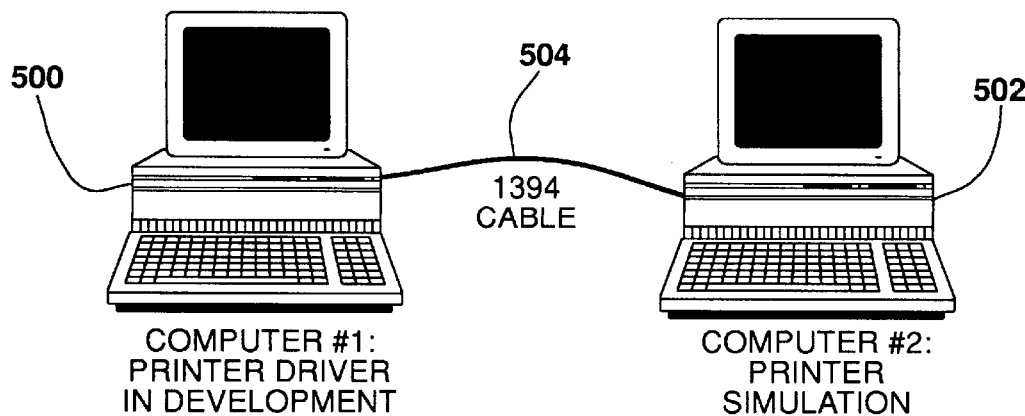
FIG. 5 and FIG. 6 illustrate a candidate product development effort using the SerialSoft software and hardware.
Figure 6:
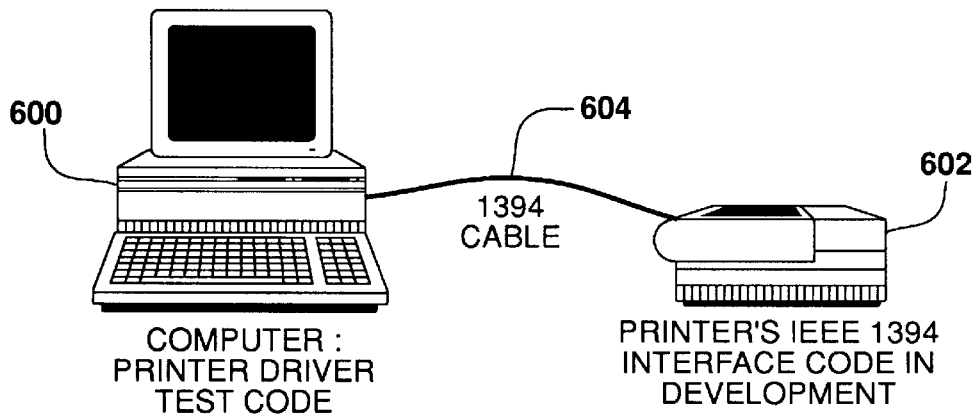

Consider the development of a printer with an IEEE 1394 interface. FIG. 5 and FIG. 6 illustrate an example of the development environment using the apparatus and method according to the present invention. In this example, there are two software elements which must be developed at the same time: the IEEE 1394 printer driver to be used by the computer and the IEEE 1394 interface software to be used by the printer.

IEEE 1394 Printer Driver Test

FIG. 5 illustrates how the printer driver for the computer could be developed. Assume computer 500 contains the printer driver code under development written to API 402 (See FIG. 4). Computer 502 contains test code simulating the printer. Both computers contain apparatus in accordance with the present invention providing an IEEE 1394 interface and the computers are connected by an IEEE 1394 cable 504.

Computer 500 sends printer data to computer 502 followed by computer 502 returning printer status to computer 500. The printer data of computer 500 could initially come from a stored file of canned printer data but this could later be replaced by a word processor for more general testing. The printer data received by computer 502 could be stored in a file and verified either by manual inspection or by comparison to a copy of the data from computer 500. A Printer (not shown) attached to computer 502 could then transmit a canned status response to computer 500 which could verify the data in a similar manner.

Printer IEEE 1394 Interface Test

FIG. 6 illustrates how the internal printer software could be developed. Assume the computer 600 has test code to send printer packets to the printer 602 over an IEEE 1394 cable 604. Printer 602 contains the actual printer IEEE 1394 interface code under development.

The computer exercises all functions of the printer using the IEEE 1394 connection.

Integration Test

Once the computer driver and the printer interface code are operational within their respective development environments, the computer could use a word processing application to send true printer data to the printer for final evaluation.

INTRODUCTION TO THE APPLICATION PROGRAMMING INTERFACE ACCORDING TO THE PRESENT INVENTION

The Application Programming Interface (API) is a collection of programming calls to be used by an application to manage data being written to and obtained from a device on an IEEE 1394 bus.

Asynchronous Data Buffering

Incoming Asynchronous Write Transactions

Figure 7:
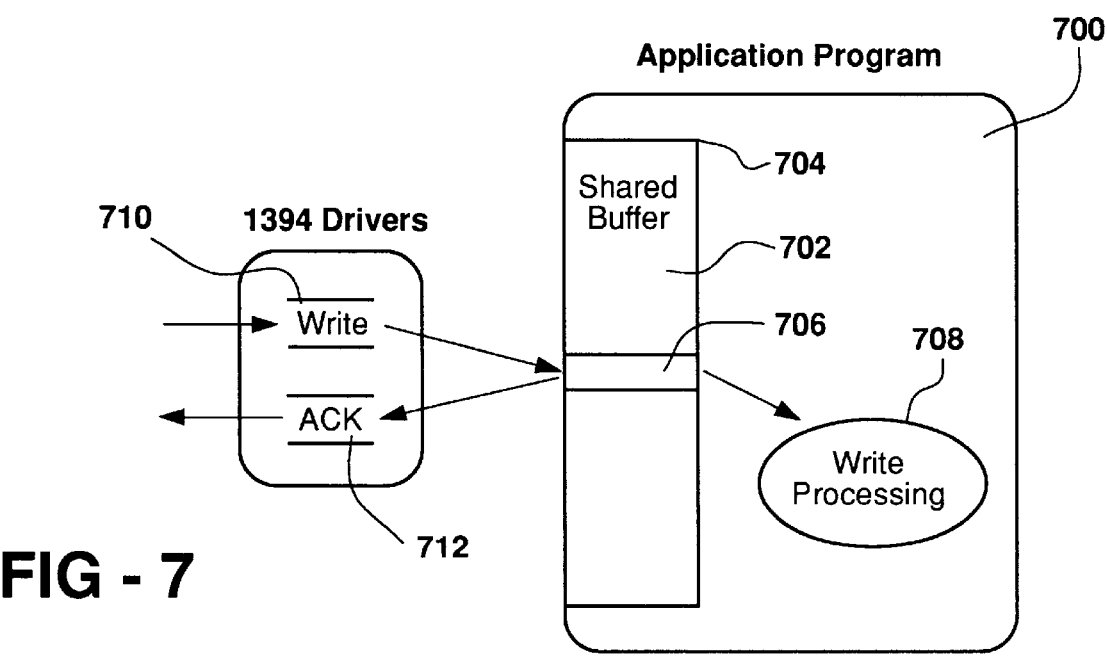
FIG. 7 illustrates data buffering used by the server application for asynchronous data transport.

FIG. 7 illustrates the method of handling incoming asynchronous write transactions in accordance with the present invention.

1. Application program 700 provides a buffer 702 for the IEEE 1394 API input.

2. The buffer 702 is mapped to a certain area of the IEEE 1394 address space 704.

3. As write transactions 710 to the specified address space arrive, their data is written to the buffer 702 at location 706.

4. An acknowledgment 712 is returned to the originator providing pass/fail information.

5. The application uses a synchronization method to find out if sufficient data has been written to process such as a timer or shared memory semaphore.

6. The application invokes an appropriate handler 708 for the data.

Incoming Asynchronous Read Transaction

There is really no particular processing required for incoming read transactions. The IEEE 1394 driver reads whatever happens to be in the buffer at the requested address when the read transaction arrives. It is the application's responsibility to make sure the buffer contains useful information.

Note that in most applications it is necessary to use a combination of writes and reads. For example, the requesting node first writes the address or other identifier of a desired block of information. The application then performs the processing necessary to produce the information and places the result in the buffer. Next, the application places a ready flag in the buffer at a known location. The requesting node periodically reads the location of the ready flag until the data is available. Once the ready flag appears, the requesting node then uses a read transaction to retrieve the desired block of data.

Asynchronous Data Transfer Example

Asynchronous data transfer follows the server-client communication model.

Asynchronous Communications Model for the Server Application

Figure 8:
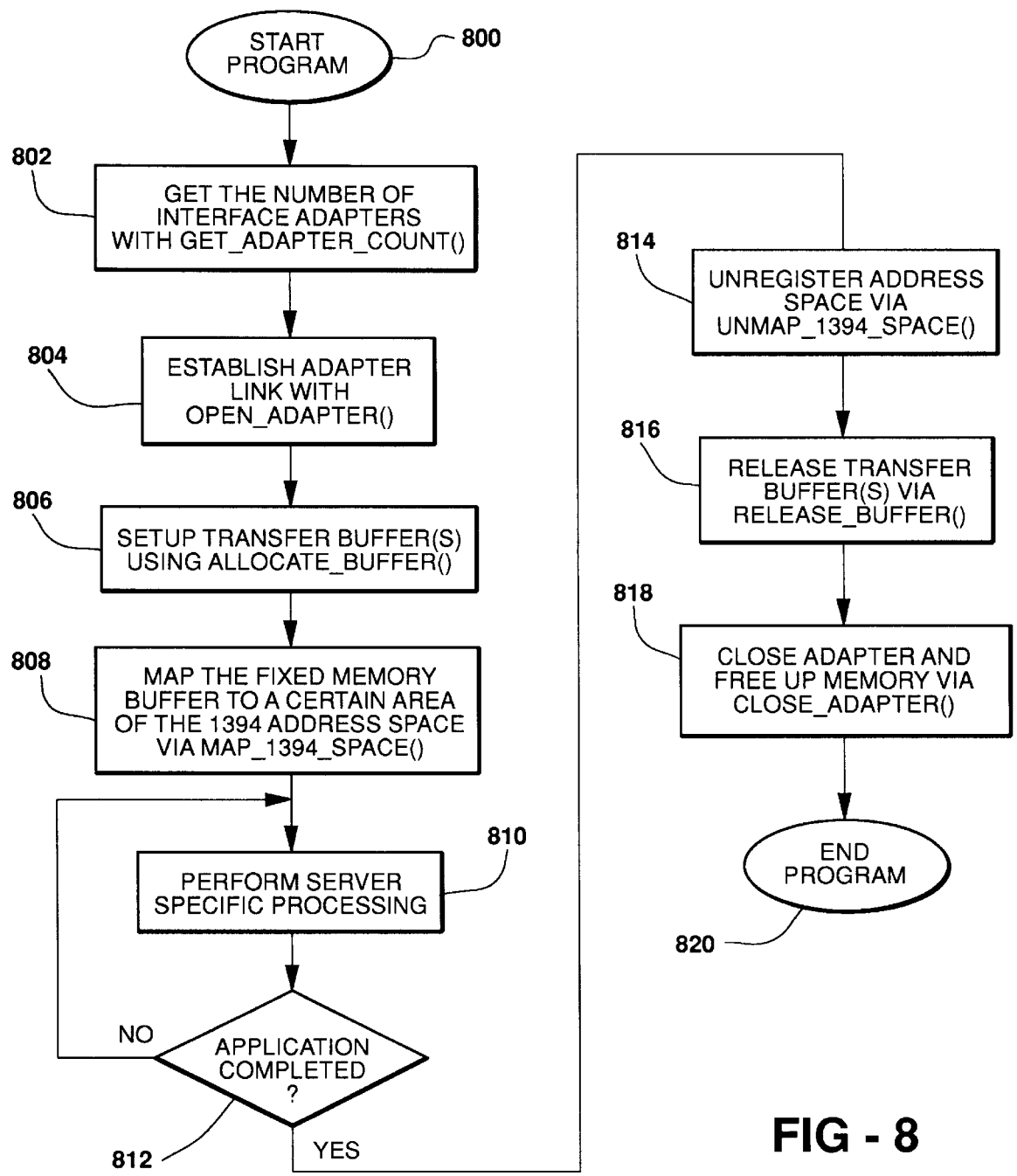
FIG. 8 and FIG. 9 contain programming flow diagrams representing client and server applications for asynchronous data transport respectively.

FIG. 8 illustrates the flow diagram of the asynchronous communication model for a server application. After the process starts in step 800, the number of adapters installed in the system is determined by the get_adapter_count( ) call in step 802. The number of adapters found is returned from this call. Internal instance data is allocated and a connection between the application and the adapter is executed using the open_adapter( ) call in step 804. The World Wide Unique ID of the node and an application handle to be used for the balance of the calls is returned from the open_adapter( ) call. Step 806 allocates buffers of the requested size, fixed in virtual memory space so that the device driver can access them without a context switch. This process step is executed by the allocate_buffer( ) call, and returns the virtual address of a memory block.

Step 808 registers a block of application memory to shadow the specified 1394 address space so that asynchronous write/read/lock transactions to the 1394 address space have a real memory source or target. This is accomplished with the map_1394_space( ) call. Step 810 performs server specific processing. Step 812 is an if then/else statement based on the application status. If the application is not complete, then the program executes step 810 again to perform additional processing. If the application is completed, then the program executes step 814 to unregister the address space via the unmap_1394_space( ) call.

Step 816 performs a release_buffer( ) call to free the user level buffers allocated by the allocate_buffer( ) call in step 806. Step 818 frees any internal resources that the application had reserved via the close_adapter( ) call. Step 820 ends the process.

Asynchronous Communications Model for the Client Application

Figure 9:
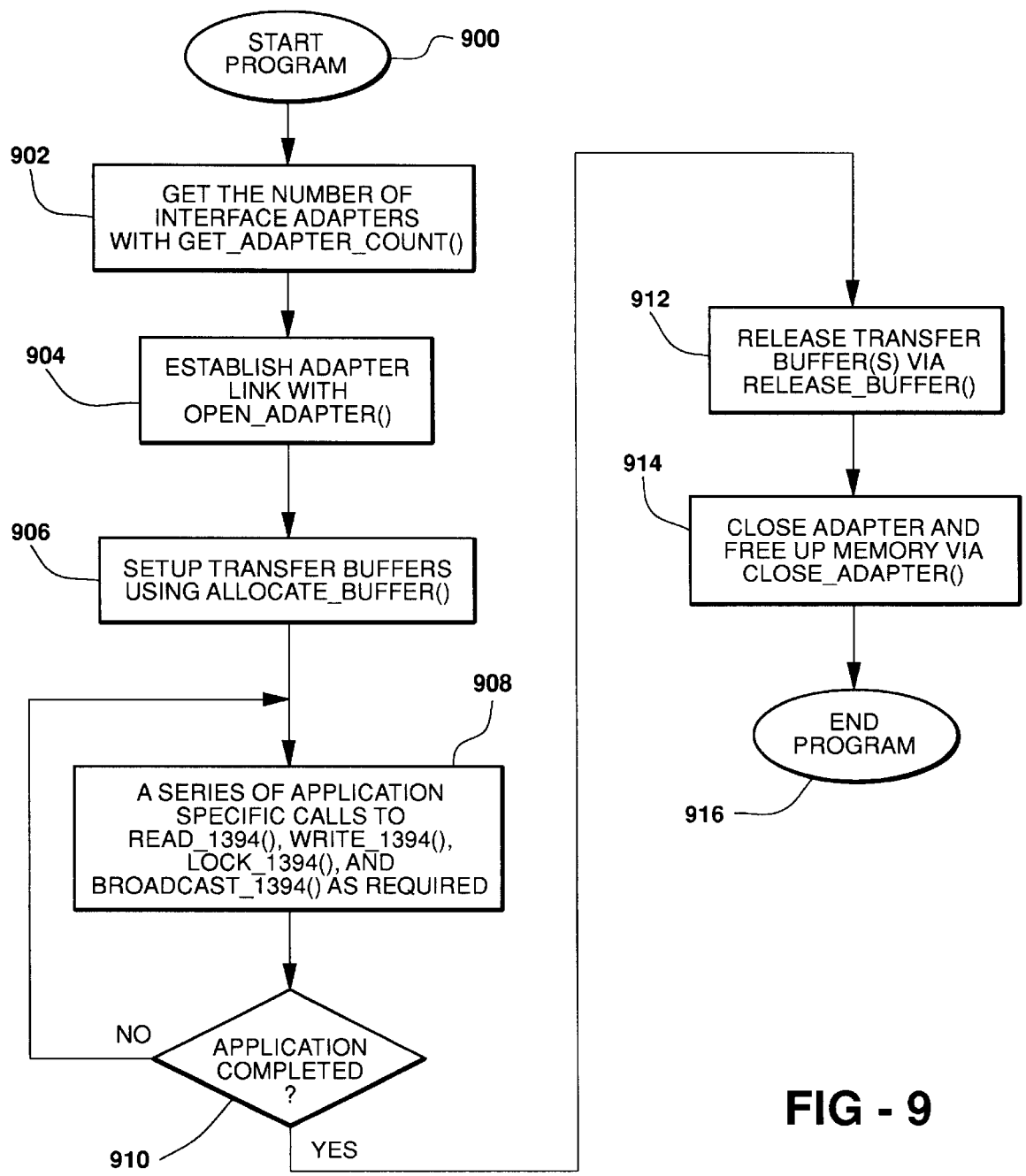

FIG. 9 illustrates the flow diagram of the asynchronous communication model for a server application. After the process starts in step 900, the number of adapters installed in the system is determined by the get_adapter_count( ) call in step 902. The number of adapters found is returned from this call. Internal instance data is allocated and a connection between the application and the adapter is executed using the open_adapter( ) call in step 904. The World Wide Unique ID of the node and an application handle to be used for the balance of the calls is returned from the open_adapter( ) call. Step 906 allocates buffers of the requested size, fixed in virtual memory space so that the device driver can access them without a context switch. This process step is executed by the allocate_buffer( ) call, and returns the virtual address of a memory block.

Step 908 contains a series of application specific calls to read, write, lock and broadcast as required. Step 910 is an if then/else statement based on the application's status. If the application is not completed, then the program executes step 908 again to perform additional application calls. If the application is completed, then the program executes step 912 to release the transfer buffers. Step 912 performs the release_buffer( ) calls to free the user level buffers allocated by the allocate_buffer( ) call in step 906. Step 914 frees any internal resources that the application had reserved via the close_adapter( ) call. Step 916 ends the process.

Isochronous talk_channel( ) Data Buffering

Figure 10:
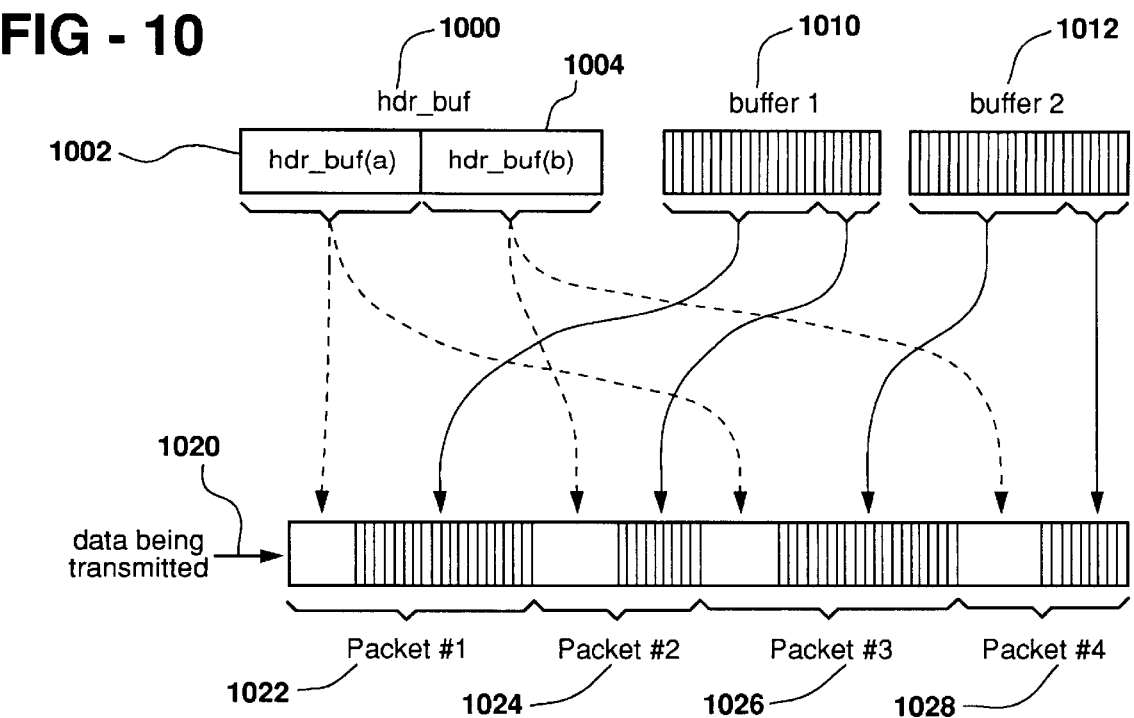
FIG. 10 and FIG. 11 illustrate data buffering used by sender and receiver application for isochronous data transport respectively.

FIG. 10 illustrates the data buffers for the API isochronous transmit command, talk_channel( ):

hdr_buf: a list of isochronous header buffers buffer: the data to be transmitted Consider a situation where two similarly sized buffers, buffer #1 1010 and buffer #2 1012, are to be transmitted and the specified packet size dictates that each buffer will be divided into two unequally sized packets. hdr_buf 1000 contains two packet headers, hdr_buf(a) 1002 and hdr_buf(b) 1004, to control the two packets taken from the buffers. Since buffer 1 and buffer 2 are similar in size, the same hdr_buf is used to control both buffer 1 and buffer 2. The actual output data is shown as 1020.

To transmit the two buffers:

1. the application executes a talk_channel( ) API command that defines 2 packets to be sent and contains pointers to hdr_buf 1000 and to buffer 1 1010.

2. packet #1 1022 is transmitted consisting of:

hdr_buf(a) 1002, the header for the first packet from buffer 1;

hdr_buf(a) contains the length of this packet.

the data starting from the beginning of buffer 1 up to the length determined by the packet length field of hdr_buf(a).

3. the API inserts a CYCLE_TIME timestamp into hdr_buf(a), the header for the current packet; this timestamp indicates that the packet was sent.

4. packet #2 1024 is transmitted consisting of:

hdr_buf(b) 1004, the header for the current packet from buffer 1;

hdr_buf(b) contains the length of this packet.

the remaining data from buffer 1.

5. the API inserts a CYCLE_TIME timestamp into hdr_buf(b), the header for the current packet.

6. the first talk_channel( ) API command is complete and returns status to the application.

7. the application executes a second talk_channel( ) command that defines 2 packets to be sent and contains pointers to hdr_buf (the same pointer contained within the first talk_channel( ) command) and to buffer 2.

8. packet #3 1026 is transmitted consisting of:

hdr_buf(a), the header for the first packet from buffer 2; hdr_buf(a) contains the length of this packet.

the data starting from the beginning of buffer 2 1012 up to the length determined by the packet length field of hdr_buf(a).

9. the API inserts a CYCLE_TIME timestamp into hdr_buf(a) 1002, the header for the current packet.

10. packet #4 1028 is transmitted consisting of:

hdr_buf(b) 1004, the header for the current packet from buffer 2;

hdr_buf(b) contains the length of this packet.

the remaining data from buffer 2.

11. the API inserts a CYCLE_TIME timestamp into hdr_buf(b), the header for the current packet.

12. the second talk_channel( ) API command is complete and returns status to the application.

Isochronous listen_channel( ) Data Buffering

Figure 11:
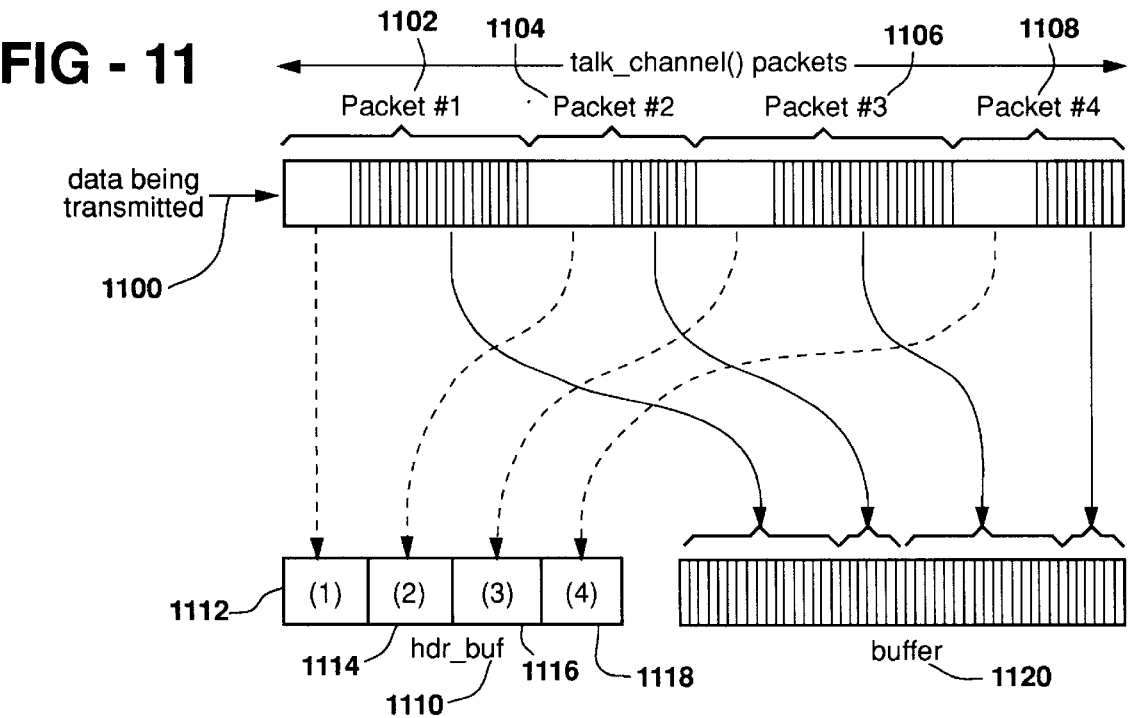

FIG. 11 illustrates the data buffers for the API isochronous receive command, receive_channel( ):

hdr_buf: an array of received isochronous headers buffer: the received data

In many situations, multiple buffers would be used to receive data but, for this example, assume the receiver has knowledge that a single buffer is large enough to accept all received data. Assume the data being received to be the transmitted data from the previous talk_channel example.

1. the application executes a listen_channel( ) API command that defines 4 packets 1100 to be received and contains pointers to hdr_buf 1110 and buffer 1120.

2. packet #1 1102 (from the talk_channel's beginning of buffer 1) is received consisting of: the header of this packet—the header contains the length of this packet and is stored in hdr_buf(1) 1112 the data—the data is stored at the beginning of buffer

3. CYCLE_TIME is inserted into hdr_buf(1) indicating this packet was received.

4. packet #2 1104 (from the talk_channel's end of buffer 1) is received consisting of:

the header of this packet—the header contains the length of this packet and is stored in hdr_buf(2) 1114 after the header from the first packet the data—the data is stored in buffer after the data from the first packet 5. CYCLE_TIME is inserted into hdr_buf(2) indicating this packet was received.

6. packet #3 1106 (from the talk_channel's beginning of buffer 2) is received consisting of:

the header of this packet—the header contains the length of this packet and is stored in hdr_buf(3) 1116 after the header from the second packet the data—the data is stored in buffer after the data from the second packet 7. CYCLE_TIME is inserted into hdr_buf(3) indicating this packet was received.

8. packet #4 1108 (from the talk_channel's end of buffer 2) is received consisting of:

the header of this packet—the header contains the length of this packet and is stored in hdr_buf(4) 1118 after the header from the third packet the data—the data is stored in buffer after the data from the third packet 9. CYCLE_TIME is inserted into hdr_buf(4) indicating this packet was received.

10. the listen_channel( ) API command is complete and returns the following status to the application:

data reception success or fail indications the number of bytes received in buffer

Isochronous Data Transfer Example

Isochronous data transfer follows the sender—receiver communication model.

Isochronous Communications Model from the Sender

Figure 12:
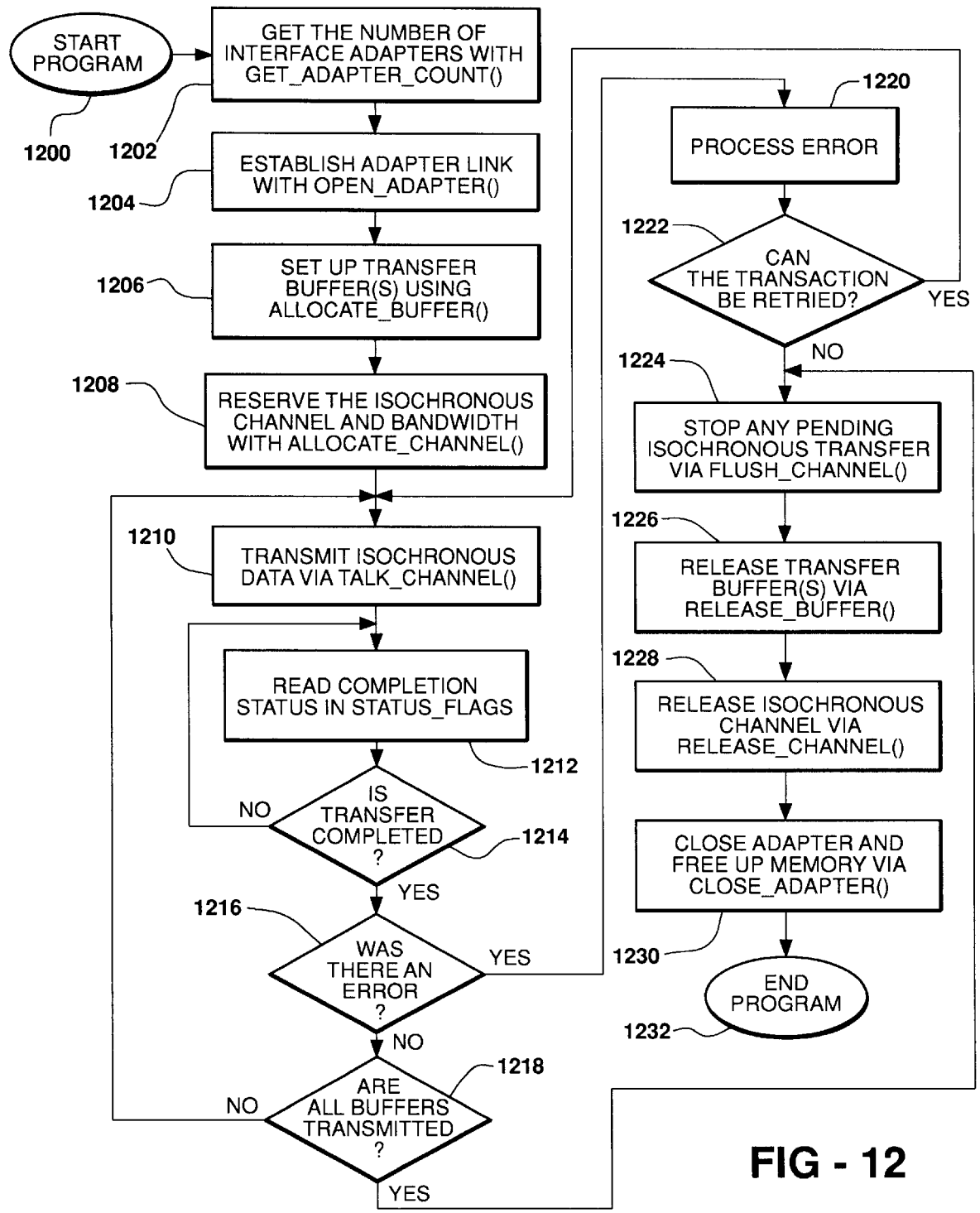
FIG. 12 and FIG. 13 contain programming flow diagrams representing sender and receiver applications for isochronous data transport respectively.

FIG. 12 is the flow diagram for the isochronous communication model for the sender. After the process starts in step 1200, the number of adapters installed in the system is determined by the get_adapter_count( ) call in step 1202. The number of adapters found is returned from this call. Internal instance data is allocated and a connection between the application and the adapter is executed using the open_adapter( ) call in step 1204. The World Wide Unique ID of the node and an application handle to be used for the balance of the calls is returned from the open_adapter( ) call. Step 1206 allocates buffers of the requested size, fixed in virtual memory space so that the device driver can access them without a context switch. Step 1206 is executed by the allocate_buffer( ) call, and returns a virtual address of memory block.

The program then reserves the isochronous channel and bandwidth via the allocate_channel( ) call in step 1208. Step 1210 transmits the isochronous data to the specified channel number, with packet sizes as specified in the header data. This is accomplished by the talk_channel( ) call, and a completion status quadlet is returned. Step 1212 reads the completion status in status_flags.

Steps 1214 through 1218 are a series of if then/else statements based on certain conditions. Step 1214 asks if the transfer is completed. If the talk_channel( ) call has completed, then the program moves on to step 1216 to look for possible error conditions. If the talk_channel( ) call has not completed, then the program goes back to execute step 1212 to continue reading the completion status. Step 1216 asks if there is an error. If there was not an error, then the program moves on to step 1218 to look at the buffer status. If there was an error, then the program executes step 1220 which will process the error. Step 1218 asks if all buffers have been transmitted. If all the buffers are transmitted, then the program will execute step 1224 to stop any pending isochronous transfers. If all the buffers are not transmitted, then the program will execute step 1210 again to continue sending data to the channel.

Step 1220 processes the error if the output from process step 1216 is "yes". Step 1222 asks if the transaction can be retried. If the transaction can be retried, then step 1210 is executed again to continue sending data. If the transaction cannot be retried, then process step 1224 is executed to stop any pending isochronous transfer.

Step 1224 clears any pending isochronous senders or receivers on the node from the application via the flush_channel( ) call, which will stop any pending isochronous transfers. Step 1226 performs the release_buffer( ) calls to free the user level buffers allocated by the allocate_buffer( ) call in step 1206. Step 1228 releases an isochronous channel via the release_channel( ) call. Step 1230 frees any internal resources that the application had reserved via the close_adapter( ) call. Step 1232 ends the program.

Isochronous Communications Model from the Receiver

Figure 13:
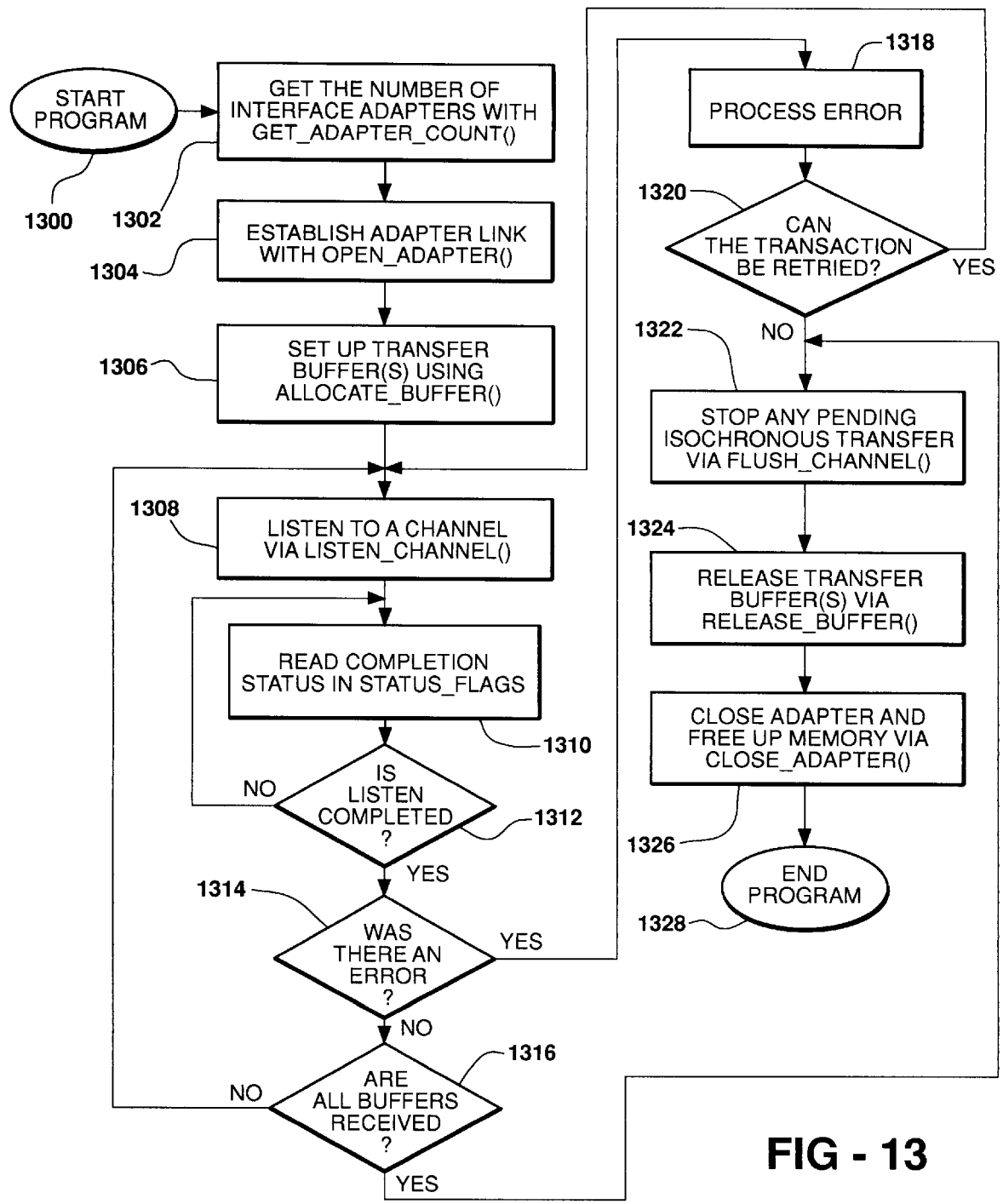

FIG. 13 is the flow diagram for the isochronous communication model for the sender. After the program starts in step 1300, the number of adapters installed in the system is determined by the get_adapter_count( ) call in step 1302.

The number of adapters found is returned from this call. Internal instance data is allocated and a connection between the application and the adapter is executed using the open_adapter( ) call in step 1304. The World Wide Unique ID of the node and an application handle to be used for the balance of the calls is returned from the open_adapter( ) call. Step 1306 allocates buffers of the requested size, fixed in virtual memory space so that the device driver can access them without a context switch. Step 1306 is executed by the allocate_buffer( ) call, and returns the virtual address of a memory block.

The program then performs a listen_channel( ) operation as defined in step 1308. This will cause the transaction layer to request the link layer to begin passing isochronous packets with the specified channel number. Multiple applications can listen to the same channel number, and the transaction layer is responsible for maintaining a list of applications that need to see a specific channel number's packet traffic. A completion status quadlet is returned from the listen_channel( ) call. Step 1310 reads the completion status in status_flags.

Steps 1312 through 1316 are a series of if then/else statements based on certain conditions. Step 1312 asks if the listening is completed. If the listen_channel( ) call has completed, then the program moves on to step 1314 to look for possible error conditions. If the listen_channel( ) call has not completed, then the program goes back to execute step 1310 to continue reading the completion status. Step 1314 asks if there is an error. If there was not an error, then the program moves on to step 1316 to look at the buffer status. If there was an error, then the program executes step 1318 which will process the error. Step 1316 asks if all buffers have been received. If all the buffers are received, then the program will execute step 1322 to stop any pending isochronous transfers. If all the buffers are not received, then the program will execute step 1308 again to continue listening to the channel.

Step 1318 processes the error if the output from step 1314 is "yes". Step 1320 asks if the transaction can be retried. If the transaction can be retried, then step 1308 is executed again to continue listening. If the transaction cannot be retried, then step 1322 is executed to stop any pending isochronous transfer.

Step 1322 clears any pending isochronous senders or receivers on the node from the application via the flush_channel( ) call, and will stop any pending isochronous transfers. This will inform the transaction layer that the application is no longer interested in the specified isochronous stream. Step 1324 performs the release_buffer( ) call to free the user level buffers allocated by the allocate_buffer( ) call in step 1306. Step 1326 frees any internal resources that the application had reserved via the close_adapter( ) call. Step 1328 ends the program.

THE APPLICATION PROGRAMMING INTERFACE

Summary of Application Programming Interface Calls

The following API Calls are available for use by the application.

| API Name | Description |
| --- | --- |
| allocate_buffer() | Allocate a buffer of pinned computer memory |
| allocate_channel() | Allocate an isochronous channel |
| broadcast_1394() | Broadcast to all devices on local bus segment |
| close_adapter() | Close an adapter and free up memory |
| flush_channel() | Release a buffer used for isochronous reception |
| get_adapter_count() | Get number of interface adapters in computer |
| get_phyid() | Get PHYsical Layer ID |
| get_WWUID() | Get WWUID (World-Wide Unique ID) |
| listen_channel() | Queue a buffer for isochronous reception |
| lock_1394() | Asynchronous read or write using a Lock |
| map_1394_space() | Register address space for a 1394 device |
| open_adapter() | Open an adapter |
| read_1394() | Read asynchronous data from a 1394 device |
| release_buffer() | Release buffer space |
| release_channel() | Release an isochronous channel |
| reset_bus() | Initiate a bus reset |
| talk_channel() | Queue a buffer for isochronous transmission |
| unmap_1394_space(1) | Unregister address space for a 1394 device |
| write_1394() | Write asynchronous data to a 1394 device |

Status_Flags and Response_Accumulator Indicators

API commands involving data transmission are not synchronous. They therefore return both a return code and a pointer to a variable called status in the remote node. The API command's return code indicates the immediate success or failure of the command's execution but status indicates the progression of the data transaction once this data transaction command is successfully executed. A typical procedure is to:

1. execute a data transaction API command.

2. determine if this command is immediately successful or not.

3. if successful, poll status until the data transaction is complete.

Asynchronous Data Transfer

The asynchronous data transfer API commands are lock_1394( ), read_1394( ), write_1394( ), and broadcast_1394( ). status is a quadlet composed of two 16-bit components:

status_flags—an indicator of the current status of these API commands response_accumulator—an accumulation of individual per packet IEEE 1394 response codes Isochronous Transfer The isochronous data transfer API commands are talk_channel( ) and listen_channel( ). isoch_status is composed of three 1-quadlet fields:

count—the number of packets sent or received size—the size of the data buffer sent or received, in bytes status is a quadlet composed of two 16-bit components:

status_flags—an indicator of the current status of these API commands; these are the same set of indicators used by the asynchronous API commands response_accumulator—an accumulation of individual per packet response codes; these indicators differ from the asynchronous set.

Buffer Management

The buffer management API commands are allocate_buffer( ), release_buffer( ), map_1394_space( ) and unmap_1394_space( ).

Session Management

The session management API commands are get_adapter_count( ), open_adapter( ), close_adapter( ), get_WWUID( ) and get_phyid( ).

Isochronous Resource Management

The isochronous resource management API commands are allocate_channel( ), release_channel( ) and flush_channel( ).
Full Bus Management
The full bus management API command is reset_bus( ).

DETAILED DESCRIPTION OF THE API allocate_buffer( )

To allocate a fixed buffer of pinned application memory for communication between the application and the API.

| QUAD huge* allocate_buffer(QUAD buffer_size, int far *rc) |
|---| where,

| buffer_size | size of requested buffer in bytes, rounded up to the next quadlet boundary |
|---|---| allocate_channel( )

To allocate an isochronous channel for communication between the application and the API. The application may request either a specific isochronous channel (0 . . . 63) or allow the API and bus manager to select the next available channel for you.

int allocate_channel(pHANDLE_1394 handle,
    QUAD far *channel,
    DWORD bytes_per_second)

where,

| handle | handle of the IEEE 1394 interface previously connected by open_adapter() |
|---|---|
| *channel | pointer to isochronous channel, either 0 . . . 63: request specific isochronous channel, or ALLOC_CHAN_ANY_CHANNEL: request next available isochronous channel |
| bytes_per_second | maximum number of payload bytes per second to be transported over the specified isochronous channel | broadcast_1394( )

To broadcast packet(s) on the local bus segment to all IEEE 1394 devices.

| int broadcast_1394(pHANDLE_1394 handle, pADDRESS_1394 target_address, QUAD target_length, QUAD huge *buffer, QUAD far *status) |
|---| where,

| handle | handle of the IEEE 1394 interface previously connected by open_adapter() |
|---|---|
| target_address | 48-bit address of the IEEE 1394 target application |
| target_length | packet length in bytes, rounded up to the next quadlet boundary if necessary |
| *buffer | pointer to buffer | close_adapter( )

To close the connection to the specified IEEE 1394 interface (e.g., adapter card) and free any unused memory associated with this interface. int close_adapter (pHANDLE_1394 handle)

where,

| handle | handle of the IEEE 1394 interface to be closed |
|---|---| flush_channel( )

To flush any waiting incoming or outgoing isochronous buffers from the queue.

int flush_channel(pHANDLE_1394 handle,
    QUAD channel)

where,

| handle | handle of the IEEE 1394 interface previously connected by open_adapter() |
|---|---|
| channel | isochronous channel | get_adapter_count( )

To get the number of IEEE 1394 interfaces (e.g., adapter cards) installed in this computer or IEEE 1394 device.

int get_adapter_count( )

get_phyid( )

To get the phyid, the physical layer identification, for the IEEE 1394 interface (e.g., adapter card) specified by its handle.

int get_phyid(pHANDLE_1394 handle)

where,

| handle | handle of the IEEE 1394 interface previously connected by open_adapter() |
|---|---| get_WWUID( )

To get the WWUIDs (World-Wide Unique IDs) of all IEEE 1394 device connected to a specified bus segment.

| int get_WWUID(pHANDLE_1394 handle, QUAD bus_segment, pWWUID pwwuid_array, QUAD far *number_valid) |
|---| where,

| handle | handle of the IEEE 1394 interface previously connected by open_adapter() |
|---|---|
| bus_segment | specific IEEE 1394 bus segment to be perused; set to one of the following: THIS_BUS_SEG, FIRST_BUS_SEG, NEXT_BUS_SEG |
| pwwuid_array | pointer to an array of 64 WWUID structures |
| *number_valid | pointer to a QUAD holding the number of valid entries in the WWUID array | listen_channel( )

To queue a buffer for isochronous reception.

| int listen_channel(pHANDLE_1394 handle, QUAD channel, pISOCH_HDR hdr_buf, QUAD hdr_count, QUAD hugh *buffer, QUAD buffer_size, pISOCH_STATUS isoch_status) |
|---| where,

| | |
|---|---|
| handle | handle of the IEEE 1394 interface previously connected by open_adapter() |
| channel | isochronous channel |
| packet_count | number of packets to be received |
| header | isochronous header |
| *buffer | pointer to data being received | lock_1394( )

To perform an asynchronous read or write to another IEEE 1394 device defined by its World Wide Unique ID (WWUID) and perform a lock operation in that device forcing an atomic transaction.

```
int lock_1394(pHANDLE_1394 handle,
              pWWUID       target_wwuid,
              QUAD         lock_type,
              pADDRESS_1394 target_address,
              QUAD         source_length,
              QUAD huge    *buffer,
              QUAD far     *status_flags)
``` where,

| | |
|---|---|
| handle | handle of the IEEE 1394 interface previously connected by open_adapter() |
| target_wwuid | WWUID of the IEEE 1394 node receiving the lock operation |
| lock_type | specific lock operation to be performed; select one of the following: BOUNDED_ADD, COMPARE_SWAP, FETCH_ADD, LITTLE_ADD, MASK_SWAP, or WRAP_ADD |
| target_address | 48-bit address of the IEEE 1394 application |
| source_length | buffer size in bytes, rounded up to the next quadlet boundary if necessary |
| *buffer | pointer to data that is both written to and read from the target PHY ID depending upon the lock operation specified by lock_type |
| *status_flags | pointer to a status indicating that the request is pending, completed or which error has occurred | map_1394_space( )

To register an incoming IEEE 1394 address space region so that other IEEE 1394 devices can write to or read from this address space.

```
MAP_HANDLE map_1394_space(pHANDLE_1394 handle,
                         pADDRESS_1394 1394_address,
                         QUAD          1394_length,
                         QUAD huge     *buffer,
                         int far       *rc)
``` where,

| | |
|---|---|
| handle | handle of the IEEE 1394 interface previously connected by open_adapter() |
| 1394-_address | 48-bit address of the IEEE 1394 application, on quadlet boundary |
| 1394_length | buffer size in bytes, rounded up to the next quadlet boundary if necessary |
| *buffer | pointer to buffer allocated by allocate_buffer() | open_adapter( )

To establish a connection to a specific IEEE 1394 interface (e.g., adapter card) and obtain its handle and World-Wide Unique ID (WWUID).

```
pHANDLE_1394 open_adapter(QUAD adapter_number,
                         pWWUID pwwuid,
                         int far *rc)
``` where,

| | |
|---|---|
| adapter_number | IEEE 1394 interface number: 0 for the first interface, 1 for the next, etc. | read_1394( )

Read packet(s) received by asynchronous transport from an IEEE 1394 device specified by its World Wide Unique ID (WWUID).

```
int read_1394(pHANDLE_1394 handle,
              pWWUID       source_wwuid,
              pADDRESS_1394 source_address,
              QUAD         source_length,
              QUAD huge    *buffer,
              QUAD far     *status_flags)
``` where,

| | |
|---|---|
| handle | handle of the IEEE 1394 interface previously connected by open_adapter() |
| source_wwuid | WWUID of the IEEE 1394 node to be read |
| source_address | 48-bit address of the IEEE 1394 application |
| source_length | buffer size in bytes, rounded up to the next quadlet boundary if necessary |
| *buffer | pointer to data storage location |
| *status_flags | pointer to a status where bits indicate that the request is pending, completed or which error has occurred | release_buffer( )

To release a previously allocated buffer.

int release_buffer(void huge *buffer)

where,

| | |
|---|---|
| *buffer | pointer to previously allocated buffer | release_channel( )

To release an isochronous channel previously allocated for communication.

```
int release_channel(pHANDLE_1394 handle,
                   QUAD  channel,
                   DWORD bytes_per_second)
``` where,

| | |
|---|---|
| handle | handle of the IEEE 1394 interface previously connected by open_adapter() |
| channel | 0 . . . 63: isochronous channel number to be released |
| bytes_per_second | number of payload bytes per second previously requested for this isochronous channel by allocate_channel() | reset_bus( )

To initiate a bus reset of the IEEE 1394 bus.

void reset_bus(pHANDLE_1394 handle)

where,

| | |
|---|---|
| handle | handle of the IEEE 1394 interface previously connected by open_adapter() | talk_channel( )

To queue up a buffer for isochronous transmission.
where,

```
int talk_channel(pHANDLE_1394 handle,
                 QUAD channel,
                 pISOCH_HDR hdr_buf,
                 QUAD hdr_count,
                 QUAD hugh *buffer,
                 QUAD buffer_size,
                 pISOCH_STATUS isoch_status)
``` where,

| | |
|---|---|
| handle | handle of the IEEE 1394 interface previously connected by open_adapter() |
| channel | isochronous channel, 0 . . . 63 |
| hdr_buf | buffer containing an array of isochronous header structures, one for each packet transmitted |
| hdr_count | number of header structures in hdr_buf |
| *buffer | pointer to data to be transmitted |
| buffer_size | length of data buffer, in bytes | unmap_1394_space( )

To unregister a previously registered block of 1394 address space.

```
int unmap_1394_space(pHANDLE_1394 handle,
                     MAP_HANDLE map_handle)
``` where,

| | |
|---|---|
| handle | handle of the IEEE 1394 interface previously connected by open_adapter() |
| map_handle | handle returned by earlier map_1394_space registration of this space | write_1394( )

To write packet(s) by asynchronous transport to the specific target World Wide Unique ID (WWUID) mapped address space.

```
int write_1394(pHANDLE_1394 handle,
               pWWUID target_wwuid,
               pADDRESS_1394 target_address,
               QUAD target_length,
               QUAD huge *buffer,
               QUAD far *status_flags)
``` where,

| | |
|---|---|
| handle | handle of the IEEE 1394 interface previously connected by open_adapter() |
| target_wwuid | WWUID of the IEEE 1394 node being written to |
| target_address | 48-bit address of the IEEE 1394 application |
| target_length | buffer size in bytes, rounded up to the next quadlet boundary if necessary |
| *buffer | pointer to source data to be written |

-continued

| | |
|---|---|
| *status_flags | pointer to a status indicating that the request is pending, completed or which error has occurred |

Although the invention has been described with reference to preferred embodiments thereof, it will be understood by those skilled in the art that various modifications may be made in implementations of the invention without departing from the spirit or scope of the invention as set forth in the following claims.

What is claimed is:

1. An application programming interface for interfacing an application program to a 1394 communications bus comprising:

means for initializing and configuring the 1394 bus;

means, responsive to the application program, for allocating space in a storage means associated with the application program to receive or transmit data from or to the 1394 bus;

means for controlling transmission and reception of data on the 1394 bus; and means for resetting and reconfiguring the 1394 bus when a change in device attachment occurs, wherein said means for resetting and reconfiguring includes one or more API commands callable by the application program.

2. The application programming interface according to claim 1, wherein said controlling means further comprises:

means, responsive to the application program, for translating information between a plurality of protocols to facilitate transmission and reception of data on the 1394 bus.

3. An application programming interface for controlling communications on a 1394 communications bus comprising:

means for determining a number of adapters attached to the 1394 bus;

means for establishing a link between an application program and one or more of said number of adapters;

means for allocating buffers to receive or transmit data from or to the 1394 bus;

means for mapping a memory buffer to a space in a storage means associated with the 1394 bus; and means for executing said application program by making API command calls to the application programming interface.

4. The application programming interface according to claim 3, further comprising:

means for releasing said space in said storage means;

means for releasing said allocated buffer; and means for closing each of said linked adapters.

5. The application programming interface according to claim 3, further comprising:

means for allocating a channel on the 1394 bus having a predetermined bandwidth;

means for transmitting data on said channel under control of a predetermined command;

means for testing completion status; and means for ending if said completion status indicates completion.

6. The application programming interface according to claim 5, further comprising:

means for testing to determine if data in all buffers have been transmitted; and means for transmitting data and testing completion if data in all buffers have not been transmitted.

7. The application programming interface according to claim 3, further comprising:

means for testing for transmission errors;

means for processing any error detected in said testing step;

means for retrying said transmission; and means for flushing and pending transmission on said channel.

8. A method of controlling communications on a 1394 bus comprising the steps of:

determining a number of adapters attached to the 1394 bus;

establishing a link between an application program and one or more of said number of adapters;

allocating buffers to receive or transmit data from or to the 1394 bus;

mapping a memory buffer to a space in a storage means associated with the 1394 bus; and executing said application program.

9. The method according to claim 8, further comprising the steps of:

releasing said space in said storage means;

releasing said allocated buffers; and closing each of said linked adapters.

10. The method, as recited in claim 8, further comprising the steps of:

allocating a channel on the 1394 bus having a predetermined bandwidth;

transmitting data on said channel under control of a predetermined command;

testing completion status; and ending if said completion status indicates completion.

11. The method, as recited in claim 10, further comprising the steps of:

testing to determine if data in all buffers have been transmitted; and repeating said steps of transmitting data and testing completion if data in all buffers have not been transmitted.

12. The method, as recited in claim 8, further comprising the steps of:

testing for transmission errors;

processing any error detected in said testing step;

retrying said transmission; and if said retrying is not successful, flushing and pending transmission on said channel.

13. A system for controlling communications on a communications bus comprising:

an application program;

a 1394 communications bus;

an application programming interface for interfacing the application program to the 1394 bus, the application programming interface controlling communications on the 1394 bus in response to the application program; and wherein the application programming interface comprises:

means for initializing and configuring the 1394 bus;

means, responsive to the application program, for allocating space in a storage means associated with the application program to receive or transmit data from or to the 1394 bus;

means for controlling transmission and reception of data on the 1394 bus; and means for resetting and reconfiguring the 1394 bus when a change in device attachment occurs, wherein said means for resetting and reconfiguring includes one or more API commands callable by the application program.

14. A system for controlling communications on a communications bus comprising:

an application program;

a 1394 communications bus;

an application programming interface for interfacing the application program to the 1394 bus, the application programming interface controlling communications on the 1394 bus in response to the application program; and wherein the application programming interface comprises:

means for determining a number of adapters attached to the 1394 bus;

means for establishing a link between the application program and one or more of the number of adapters;

means for allocating buffers for data storage and transmission;

means for mapping a memory buffer to a space in a storage means associated with the 1394 bus; and means for executing said application program by making API command calls to the application programming interface.

* * * * *